US009711100B2

(12) United States Patent
Choi et al.

(10) Patent No.: US 9,711,100 B2
(45) Date of Patent: Jul. 18, 2017

(54) COMMON VOLTAGE DISTORTION DETECTING CIRCUIT, LIQUID CRYSTAL DISPLAY DEVICE AND METHOD OF DRIVING THE SAME

(71) Applicant: SAMSUNG DISPLAY CO., LTD., Yongin, Gyeonggi-Do (KR)

(72) Inventors: Hyong-Do Choi, Yongin-si (KR); Yun-Nam Kim, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 357 days.

(21) Appl. No.: 14/609,921

(22) Filed: Jan. 30, 2015

(65) Prior Publication Data

US 2016/0043541 A1 Feb. 11, 2016

(30) Foreign Application Priority Data

Aug. 6, 2014 (KR) ........................ 10-2014-0100983

(51) Int. Cl.
*H02H 9/02* (2006.01)
*G09G 3/36* (2006.01)
*H02H 1/00* (2006.01)

(52) U.S. Cl.
CPC ......... *G09G 3/3614* (2013.01); *G09G 3/3655* (2013.01); *G09G 2330/025* (2013.01)

(58) Field of Classification Search
CPC ............... G09G 3/3614; G09G 3/3655; G09G 2330/025
See application file for complete search history.

(56) References Cited

U.S. PATENT DOCUMENTS

| | | | | | |
|---|---|---|---|---|---|
| 8,199,095 | B2 * | 6/2012 | Jung | G09G 3/3688 | 345/98 |
| 8,305,371 | B2 * | 11/2012 | Kim | G09G 3/3655 | 345/211 |
| 8,339,423 | B2 * | 12/2012 | Tomizawa | G09G 3/2022 | 345/690 |
| 8,354,991 | B2 * | 1/2013 | Brown | G09G 3/3648 | 345/101 |
| 2014/0085174 | A1 * | 3/2014 | Inoue | G09G 3/2074 | 345/87 |

(Continued)

FOREIGN PATENT DOCUMENTS

| | | |
|---|---|---|
| KR | 1996-0038445 | 11/1996 |
| KR | 1996-0038722 | 11/1996 |

(Continued)

*Primary Examiner* — Andrew Sasinowski
(74) *Attorney, Agent, or Firm* — F. Chau & Associates, LLC

(57) ABSTRACT

A common voltage distortion detecting circuit includes a current sensor, a voltage difference voltage detecting circuit and a comparator. The current sensor is disposed between a circuit configured to apply a common voltage to a liquid crystal display panel and an input power terminal providing a power voltage. The voltage difference detecting circuit is configured to detect a difference voltage between two terminals of the current sensor. The comparator is configured to compare the difference voltage and a reference voltage to output an over current signal to convert an inversion method of the liquid crystal display panel when the difference voltage is greater than the reference voltage.

20 Claims, 8 Drawing Sheets

(56) References Cited

U.S. PATENT DOCUMENTS

2014/0333603 A1* 11/2014 Choi .................... G09G 3/3233
345/212

FOREIGN PATENT DOCUMENTS

| | | |
|---|---|---|
| KR | 100516048 | 9/2005 |
| KR | 1020060122255 | 11/2006 |
| KR | 1020070076719 | 7/2007 |

* cited by examiner

COMMON VOLTAGE DISTORTION DETECTING CIRCUIT, LIQUID CRYSTAL DISPLAY DEVICE AND METHOD OF DRIVING THE SAME

CROSS-REFERENCE TO RELATED APPLICATION

This application claims priority to Korean Patent Application No. 10-2014-0100983, filed on Aug. 6, 2014, and all the benefits accruing therefrom under 35 U.S.C. §119, the disclosure of which is incorporated by reference herein.

BACKGROUND

1. Technical Field

Exemplary embodiments of the inventive concept relate to a common voltage distortion detecting circuit, a liquid crystal display device and a method of driving the liquid crystal display device.

2. Discussion of Related Art

Display devices such as a liquid crystal display ("LCD") device and an organic light emitting display ("OLED") device may flicker, overheat, and have visual defects due to cross talk. Compensating a common voltage in these display devices may reduce flicker, overheating, and cross talk. However, this compensation causes distortion of the common voltage, which prevents the flicker, overheating, and crosstalk from being completely eliminated. Further, the compensation also increases power consumption.

SUMMARY

At least one exemplary embodiment of the inventive concept provide a common voltage distortion detecting circuit monitoring a distortion of a common voltage applied to a liquid crystal display panel so as to convert an inversion method of the liquid crystal display panel in real-time.

At least one exemplary embodiment of the inventive concept also provides a liquid crystal display device having the above-mentioned common voltage distortion detecting circuit.

At least one exemplary embodiment of the inventive concept further provides a method of driving a liquid crystal display device having the above-mentioned common voltage distortion detecting circuit.

According to an exemplary embodiment of the inventive concept, a common voltage distortion detecting circuit includes a current sensor, a voltage difference voltage detecting circuit and a comparator. The current sensor is disposed between a circuit configured to apply a common voltage to a liquid crystal display panel and an input power terminal providing a power voltage. The voltage difference detecting circuit is configured to detect a difference voltage between two terminals of the current sensor. The comparator is configured to compare the difference voltage and a reference voltage to output an over current signal to convert an inversion method of the liquid crystal display panel when the difference voltage is greater than the reference voltage.

In an exemplary embodiment, the voltage difference detecting circuit may include a current mirror which amplifies amplitude of a voltage or a current.

In an exemplary embodiment, the current shunt mirror may include a first resistor, a second resistor, an operational amplifier, and a bipolar junction transistor. The first resistor may have a first terminal connected to an input terminal of the current sensor. The second resistor may have a first terminal connected to an output terminal of the current sensor. The operational amplifier may have a positive input terminal connected to a second terminal of the first resistor and a negative input terminal connected to a second terminal of the second resistor. The bipolar junction transistor may have a base connected to an output terminal of the operational amplifier, a collector connected to a second terminal of the first resistor and a positive polarity input terminal of the operational amplifier, and an emitter connected to the comparator.

In an exemplary embodiment, the common voltage distortion detecting circuit may further include a voltage generator which generates the reference voltage. The voltage generator may include a voltage divider configured to divide into the power voltage outputted through the input power terminal to generate the reference voltage.

In an exemplary embodiment, the voltage divider may include a third resistor and a fourth resistor. The third resistor may include a first terminal connected to a ground terminal. The fourth resistor may include a first terminal connected to the input power terminal and a second terminal connected to a second terminal of the third resistor to provide the comparator with the reference voltage.

According to an exemplary embodiment of the inventive concept, a liquid crystal display device includes a liquid crystal display panel, a timing controller, a gate driving circuit, a data driving circuit, a first circuit (e.g., a common voltage applying part) and a second circuit (e.g., a common voltage distortion detecting circuit). The liquid crystal display panel includes a switching element connected to a gate line and a data line, and a liquid crystal capacitor connected to the switching element. The timing controller is configured to output a data signal, a first control signal, a second control signal and a third control signal in response to an input image data and an input control signal (e.g., provided from an external device). The gate driving circuit is configured to output a gate signal for driving the gate line to the gate line in response to the first control signal. The data driving circuit is configured to output the data signal to the data line in response to the second control signal. The common voltage applying part is configured to apply a common voltage to a second terminal of the liquid crystal capacitor in response to the third control signal. The common voltage distortion detecting circuit is configured to monitor an input power voltage applied to the common voltage applying part and to output an over current signal to convert an inversion method of the liquid crystal display panel when an over current is generated.

In an exemplary embodiment, the common voltage distortion detecting circuit may include a current sensor, a voltage difference detecting circuit, and a comparator. The current sensor may be disposed between the common voltage applying part and an input power terminal providing the input power voltage. The voltage difference detecting circuit may be configured to detect a difference voltage between two terminals of the current sensor. The comparator may be configured to compare the difference voltage and a reference voltage to output the over current signal when the difference voltage is greater than the reference voltage.

In an exemplary embodiment, the common voltage distortion detecting circuit may further include a voltage generator configured to generate the reference voltage. The voltage generator may include a voltage divider configured to divide the power voltage outputted through the input power terminal to generate the reference voltage.

In an exemplary embodiment, the timing controller may include an inversion method converting part configured to convert an inversion method of the liquid crystal display panel based on the over current signal.

In an exemplary embodiment, the second control signal may include an STV signal indicating a start of a frame (e.g., provided from an external device). The inversion method converting part may include a counter and a shift register. The counter may be configured to count a time that an over current is continued by a frame in response to the STV signal. The shift register may be configured to output a signal which changes a register value of a register storing information for an inversion method of a liquid crystal display panel, when the timing controller determines that the over current is generated during a predetermined frame using the counter.

In an exemplary embodiment, the counter may include a plurality of AND gates, a plurality of JK flip-flops and an inverter.

In an exemplary embodiment, the shift register may include a plurality of JK flip-flops connected in a sequential manner.

In an exemplary embodiment, the voltage difference detecting circuit may include a current shunt mirror amplifying voltage or current.

In an exemplary embodiment, the timing controller converts the inversion method by selecting an inversion method from a plurality of inversion methods other than a current inversion method in response to the over current signal, and controls the data driving circuit so as to control a polarity of the data signal in accordance with the selected inversion method.

In an exemplary embodiment, the inversion methods may include a line inversion driving, a column inversion driving, a dot inversion driving, a frame inversion driving, a (1+2) dot inversion driving, and a (1+2) line inversion driving.

In an exemplary embodiment, the timing controller may control the data driving circuit, so that the data driving circuit converts a polarity of the data signal to output the converted polarity of the data signal, when the over current is continuously provided for a first frame.

According to an exemplary embodiment of the inventive concept, there is provided a method of driving a liquid crystal display device. In the method, a liquid crystal display panel is driven (e.g., by a controller) in accordance with an initial inversion method. An input power applied to a common voltage applying part is monitored (e.g., by a first circuit) to determine whether an over current is generated or not. Then, the number of first frame(s) is counted (e.g., by the controller) when it is determined that the over current is generated. Then, the inversion method is changed (e.g., by the controller) when it is determined that the over current is continuously generated. The counting may also be reset when the inversion method is changed. Then, the liquid crystal display panel is driven (e.g., by the controller) in the changed inversion method.

In an exemplary embodiment, in the method, a number of a second frame(s) may be counted when it is determined that the over current is not continuously generated. Then, after the counting of the second frames, a current inversion method of the display panel may be set to the initial inversion method. For example, the liquid crystal display panel may be driven in accordance with an initial inversion method after stopping a current inversion method.

In an exemplary embodiment, the number of the first frames may be ten, and the number of the second frames may be twenty.

According to an exemplary embodiment of the inventive concept, a liquid crystal display device includes a liquid crystal display panel, a data driving circuit, a first circuit, a second circuit, and a timing controller. The panel includes a switching element connected to a data line and a liquid crystal capacitor. The data driving circuit is configured to output a data signal to the data line. The first circuit is configured to apply a common voltage to the liquid crystal capacitor. The second circuit is configured to monitor an input power voltage applied to the first circuit to determine whether an over current is present. The timing controller is configured to change a current inversion driving method of the panel to a next method within a sequence of inversion driving methods when the over current is determined to be present. The timing controller controls the data driving circuit to set a polarity of the data signal in accordance with the selected inversion driving method.

In an exemplary embodiment, the timing controller includes a register area that stores the sequence. In an exemplary embodiment, the timing controller only changes the current inversion driving method when the over current is present continuously for an entire frame period.

In a common voltage distortion detecting circuit, a liquid crystal display device and a method of driving the liquid crystal display device according to an exemplary embodiment of the inventive concept, when an input power applied to a common voltage applying part is greater than a reference voltage, a signal is provided to a timing controller so that it may convert an inversion method of a liquid crystal display panel. Thus, at least one embodiment of the inventive concept may improve display quality when a common voltage becomes distorted.

BRIEF DESCRIPTION OF THE DRAWINGS

The invention inventive concept will become more apparent by describing in detail exemplary embodiments thereof with reference to the accompanying drawings, in which.

DETAILED DESCRIPTION

Hereinafter, exemplary embodiments of the inventive concept will be described in detail with reference to the accompanying drawings.

Figure 1:
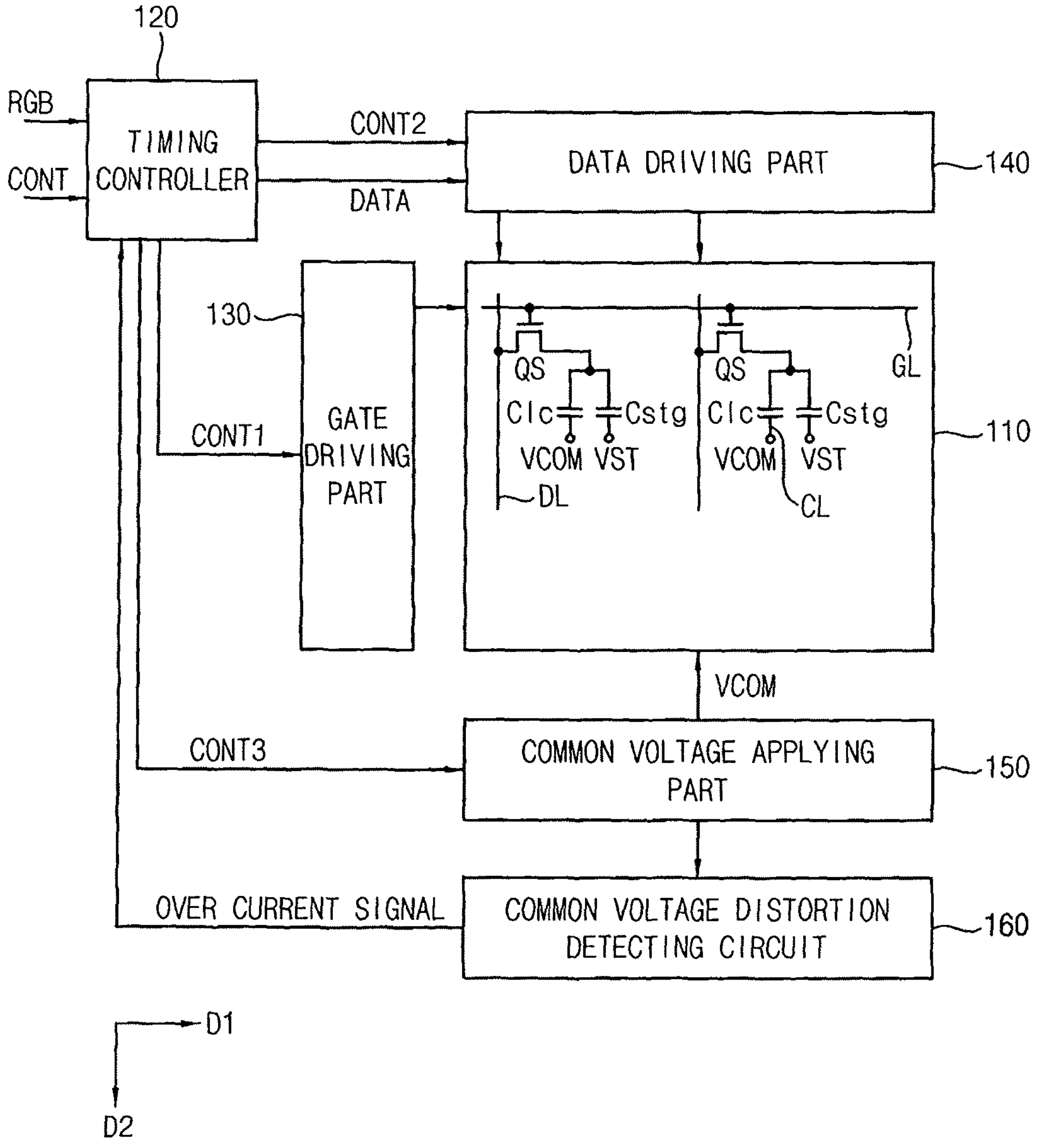
FIG. 1 is a block diagram illustrating a liquid crystal display device according to an exemplary embodiment of the inventive concept.

FIG. 1 is a block diagram illustrating a liquid crystal display device according to an exemplary embodiment of the inventive concept.

Referring to FIG. 1, a liquid crystal display device according to an exemplary embodiment of the inventive concept includes a liquid crystal display panel 110, a timing controller 120, a gate driving part 130, a data driving part 140, a common voltage applying part 150 and a common voltage distortion detecting circuit 160.

The liquid crystal display panel 110 includes a plurality of gate lines GL, a plurality of data lines DL, a plurality of common electrode lines CL and a plurality of unit pixels electrically connected to the gate lines GL and the data lines DL, respectively. The gate lines GL extend in a first direction D1, and the data lines DL extend in a second direction D2. The first direction D1 may cross with the second direction D2.

Each of the unit pixels may include a switching element QS (e.g., a switching transistor), a liquid crystal capacitor Clc electrically connected to the switching element QS and a storage capacitor Cstg electrically connected to the switching element QS. A first terminal of the liquid crystal capacitor Clc and a first terminal of the storage capacitor Cstg are connected to a drain electrode of the switching element QS. A common voltage VCOM is applied (e.g., through common electrode line CL) to a second terminal of the liquid crystal capacitor Clc, and a storage voltage VST is applied to a second terminal of the storage capacitor Cstg. Each of the unit pixels may be disposed in a matrix shape.

The timing controller 120 receives input image data RGB and an input control signal CONT from an external device (not shown). The input image data RGB may include red image data R, green image data G and blue image data B. The input control signal CONT may include a clock signal, a data enable signal, a vertical synchronization signal or a horizontal synchronization signal Hsync, for example.

The timing controller 120 generates a first control signal CONT1, a second control signal CONT2, a third control signal CONT3 and a data signal DATA based on the input image data RGB and the input control signal CONT.

The timing controller 120 generates the first control signal CONT1 for controlling an operation of the gate driving part 130 based on the input control signal CONT and outputs the first control signal CONT1 to the gate driving part 140. The first control signal CONT1 may include a start of vertical signal STV and a gate clock signal. The STV signal may also be referred to as a start pulse vertical signal.

The timing controller 120 generates the second control signal CONT2 for controlling an operation of the data driving part 140 based on the input control signal CONT, and outputs the second control signal CONT2 to the data driving part 140. The second control signal CONT2 may include a horizontal start signal and a load signal.

The timing controller 120 generates the third control signal CONT3 for controlling an operation of the common voltage applying part 150 based on the input control signal CONT, and outputs the third control signal CONT3 to the common voltage applying part 150.

The gate driving part 130 generates a plurality of gate signals for driving the gate lines GL in response to the first control signal CONT1 received from the timing controller 120. The gate driving part 130 sequentially outputs the gate signals to the gate lines GL. In one exemplary embodiment, for example, the gate driving part 130 generates the gate signals outputted to the gate lines GL based on the first control signal CONT1 including a first clock signal, a second clock signal having a timing different from the first clock signal and a vertical start signal. In such an embodiment, the second clock signal is a signal inverted from the first clock signal.

In an exemplary embodiment, the gate driving part 130 is directly mounted on the liquid crystal display panel 110 or connected to the liquid crystal display panel 110 in a tape carrier package ("TCP") manner. Alternatively, the gate driving part 130 may be integrated on the liquid crystal display panel 110.

The data driving part 140 provides the data lines DL with a data signal. In one exemplary embodiment, for example, the data driving part 140 provides the data line with a data signal corresponding to a white gradation after the switching element QS is turned off, after the switching element QS was in a previous turn-on state.

In an exemplary embodiment, the data driving part 140 receives the second control signal CONT2 and the data signal DATA from the timing controller 120 and receives a gamma reference voltage from a gamma reference voltage generating part (not shown). The data driving part 140 converts the data signal DATA into a data voltage of analog type using the gamma reference voltage. The data driving part 140 outputs the data voltage to the data line DL.

The data driving part 140 may include a shift register (not shown), a latch (not shown), a signal processing part (not shown) and a buffer part (not shown). The shift register outputs a latch pulse to the latch. The latch temporarily stores the data signal DATA and then outputs the data signal DATA to the signal processing part. The signal processing part generates the data voltage of analog type based on the data signal DATA and the gamma reference voltage to output the data voltage to the buffer part. The buffer part compensates the data voltage to have a predetermined level, and then outputs the data voltage to the data line DL.

The common voltage applying part 150 generates a common voltage VCOM in response to the third control signal CONT3 to provide the common voltage VCOM (e.g., through a common voltage line CL) to a second terminal of the liquid crystal capacitor Clc.

The common voltage distortion detecting circuit 160 monitors a distortion of the common voltage VCOM. When the distortion of the common voltage VCOM is continued for a predetermined frame (or number of frames or frame periods), the common voltage distortion detecting circuit 160 requests a variation of an inversion method to the timing controller 120.

Accordingly, the timing controller 120 applies an inversion method control signal to the data driving part 140, so that the liquid crystal display panel 110 is driven in an inversion method different from a current inversion method.

For example, when it is determined that the common voltage has a distortion continuously for a certain period of time, the current inversion method is changed to a new and different inversion method. The period may occur during one or more frames in which a frame of image data is currently displayed.

In an operation, the gate driving part 130 provides the gate line GL with a turn-on voltage to turn-on the switching element QS.

Then, the data driving part 140 provides the data line DL with a data signal to charge the liquid crystal capacitor Clc and the storage capacitor Cst that are connected to the switching element QS. In this case, the data driving part 140 provides the data line DL with a data signal of a positive polarity with respect to a common voltage VCOM or a data signal of a negative polarity with respect to a common voltage VCOM in response to an inversion method controlling of the timing controller 120.

Then, the gate driving part 130 provides the gate line GL with a turn-off voltage to turn-off the switching element QS.

Figure 2:
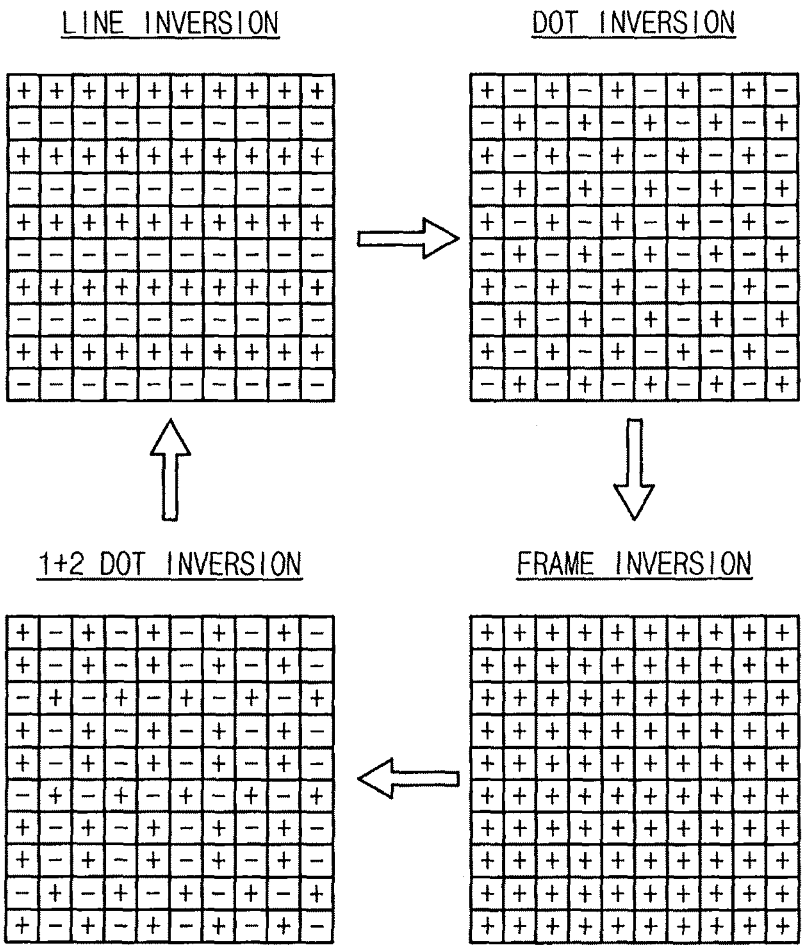
FIG. 2 is a plan view illustrating inversion methods.

FIG. 2 is a plan view illustrating various inversion methods.

Referring to FIG. 2, when a liquid crystal display panel is currently driven in a line inversion method, and common voltage distortion is detected, the timing controller 120 converts a data signal DATA so as to be driven in a dot inversion method and applies the converted data signal to the data driving part 140. In the line inversion method of an exemplary embodiment, the data signal DATA is driven so that the polarity of an entire row of pixels alternates every row. In the dot inversion method of an exemplary embodiment, the data signal DATA is driven so that the polarity of the pixels in a given row alternate with one another, and the polarities of each row alternate with one another.

Moreover, when a liquid crystal display panel is currently driven in the dot inversion method, and common voltage distortion is detected, the timing controller 120 converts a data signal DATA so as to be driven in a frame inversion method. In the frame inversion method of an exemplary embodiment, the data signal DATA is driven so that the polarity of consecutive frames alternate with one another. For example, all the pixels during a first frame period have a positive polarity, then all the pixels during a second frame period have a negative polarity, then all the pixels during a third frame period have the positive polarity, etc.

Moreover, when a liquid crystal display panel is driven in a frame inversion method, and the common voltage distortion is detected, the timing controller 120 converts a data signal DATA so as to be driven in a (1+2) dot inversion method. In the (1+2) dot inversion method of an exemplary embodiment, the data signal DATA is driven so that the polarity of the pixels in a given row alternate with one another, the polarity of the pixels in a first next row is the same as the given row, the polarity of the pixels in a second next row is opposite the previous two rows, and the polarity of the remaining rows repeats this pattern.

In FIG. 2, it is described that an inversion method is changed in a sequence of a line inversion, a dot inversion, a frame inversion, a (1+2) dot inversion and a line inversion. However, the inventive concept is not limited to this particular sequence.

Figure 3:
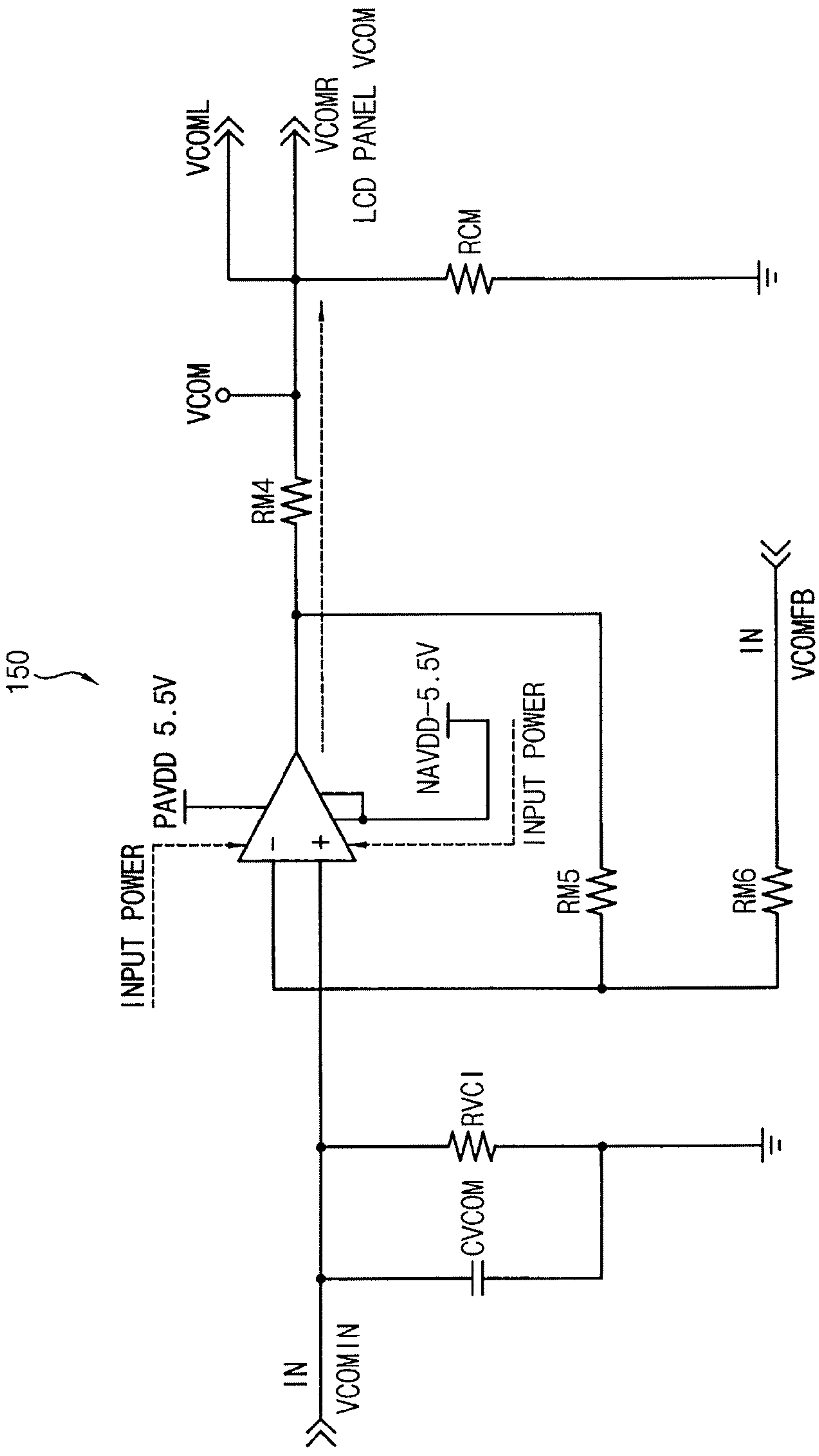
FIG. 3 is a circuit diagram schematically illustrating a common voltage applying part shown in FIG. 1 according to an exemplary embodiment of the inventive concept.

FIG. 3 is a circuit diagram schematically illustrating a common voltage applying part shown in FIG. 1.

Referring to FIG. 3, a common voltage applying part 150 includes an operational amplifier OP-AMP. In the operational amplifier OP-AMP, a common voltage VCOM is applied to a positive polarity input terminal, a positive power supply PAVDD (e.g., of about +5.5V) is applied to a positive power providing terminal, and a negative power supply NAVDD (e.g., of about −5.5V) is applied to a negative power providing terminal. Thus, the common voltage VCOM is amplified to a predetermined level to be applied to a second terminal of a liquid crystal capacitor Clc (shown in FIG. 1) of a liquid crystal display panel 110 (shown in FIG. 1). In addition to the OP-AMP, the common voltage applying part 150 includes a capacitor CVCOM, a resistor RVC1, a resistor RM4, a resistor RM5, a resistor RM6, and a resistor RCM. The input voltage applied to the positive polarity terminal may be referred to as VCOMIN. The input voltage applied to resistor RM6 may be referred to as VCOMFB. The common voltage applying part 150 may output a common voltage VCOM set to VCOML or VCOMR.

In an exemplary embodiment, detecting a distortion of a common voltage VCOM may be realized by monitoring the positive power supply (e.g., providing voltage +5.5V) and the negative power supply (e.g., providing voltage −5.5V) of the operational amplifier OP-AMP. Power consumption may be different in accordance with a driving pattern of the liquid crystal display panel 110. The timing controller 120, the gate driving part 130 (e.g., a driving IC such as a gate driving IC), the data driving part 140 (e.g., a driving IC such as a data driving IC), and the operational amplifier OP-AMP, may each consume a great deal of power.

In the case of an operational amplifier OP-AMP, power consumption is greatly increased to compensate for a distortion of a common voltage VCOM in a critical pattern. In this case, the critical pattern is a pattern where power consumption is great (e.g., greater than a threshold), that is, a pattern in which a load variation is great (e.g., greater than a threshold) within a liquid crystal display panel. In this case, the critical pattern is a pattern having a great power consumption, which has a great load variation in a liquid crystal display panel. The critical pattern is related to an inversion method of a liquid crystal display panel, that is, such as a pattern in which polarities of data signals lean toward the same polarity in the same timing. For example, the critical pattern may be a pattern displaying a full white image, a pattern displaying a full black image, a pattern displaying a mosaic image, a pattern displaying a red image and so on.

An operational amplifier OP-AMP of the common voltage applying part 150 currently consuming a great amount of power may be interpreted as a critical pattern. In an exemplary embodiment of the inventive concept, when it is determined that the OP-AMP is currently consuming a great amount of power (e.g., more than a threshold amount), an inversion method of the liquid crystal display panel is changed to decrease a load of the liquid crystal display panel and to increase stability of display quality of the liquid crystal display panel. Moreover, the common voltage applying part 150 is not overly driven to prevent overheating due to an over driving of a circuit part corresponding to the common voltage applying part 150. These driving techniques may prevent a power ripple from being generated by an over driving of a circuit part corresponding to the common voltage applying part and reduce noise due to the power ripple.

Figure 4:
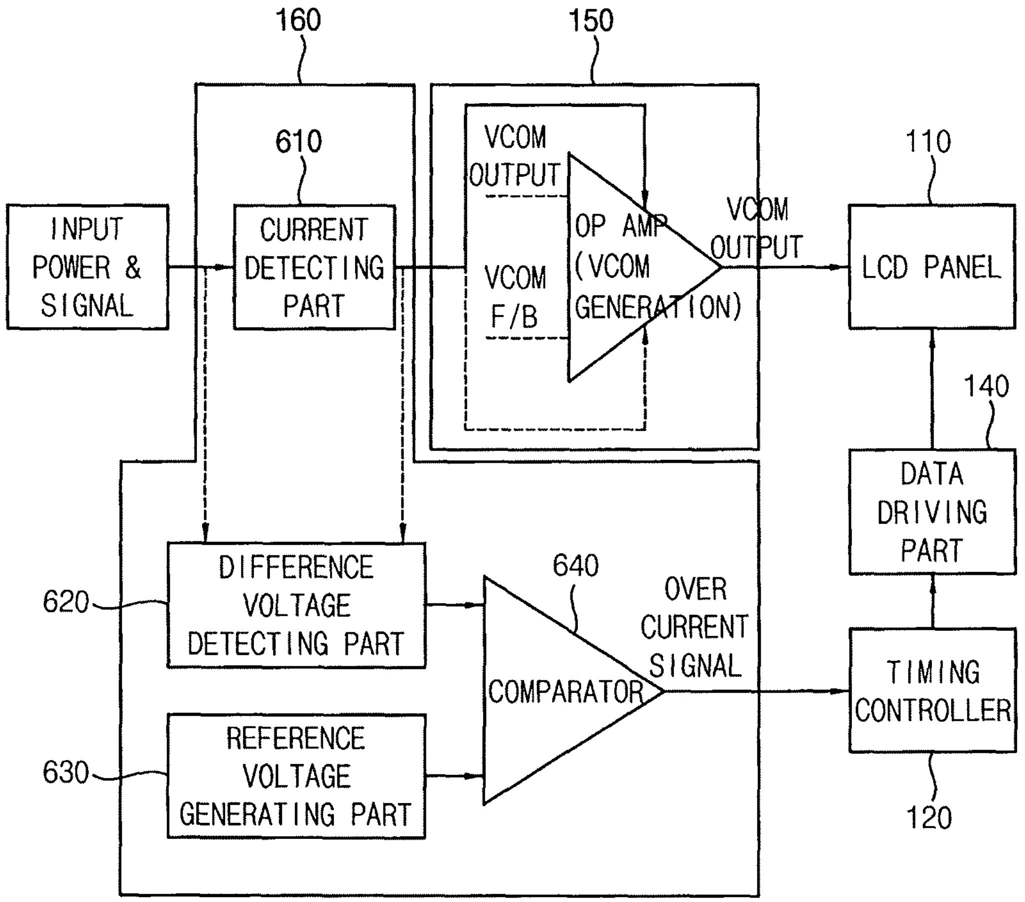
FIG. 4 is a block diagram schematically illustrating a common voltage distortion detecting circuit shown in FIG. 1 according to an exemplary embodiment of the inventive concept.

FIG. 4 is a block diagram schematically illustrating a common voltage distortion detecting circuit shown in FIG. 1.

Referring to FIGS. 1 and 4, a common voltage distortion detecting circuit 160 includes a current detecting part 610, a difference voltage detecting part 620, a reference voltage generating part 630 and a comparator 640. A shunt resistor is an example of the current detecting part 610. The current detecting part 610 may also be referred to as a current detector or a current sensor. The difference voltage detecting part 620 may also be referred to as a voltage difference detecting circuit. In an embodiment, detecting part 620 may be embodied by a comparator. A voltage divider may be an example of the reference voltage generating part 630. The common voltage distortion detecting circuit 160 monitors an input power of an operational amplifier OP-AMP of the common voltage applying part 150, and then outputs a signal to the timing controller 120 to convert an inversion method when a consumption power of the operational amplifier OP-AMP is greater than a reference value. For example, the convert may result in a current inversion method being changed to a different inversion method.

The current detecting part 610 is disposed between the common voltage applying part 150 generating a common voltage VCOM applied to a liquid crystal display panel 110 (shown in FIG. 1) and an input power terminal to convert amplitude of a current into a voltage. Particularly, the current detecting part 610 converts a current applied to a positive power applying terminal of an operational amplifier and a current applied to a negative power applying terminal of the operational amplifier into a voltage.

The difference voltage detecting part 620 is connected to two terminals of the current detecting part 610 to detect a difference voltage between the current detecting part 610, and then outputs the difference voltage to the comparator 640.

The reference voltage generating part 630 generates a reference voltage Vref, and then outputs the reference voltage Vref to the comparator 640.

The comparator 640 compares the difference voltage and the reference voltage Vref. The comparator 640 outputs an over current signal to the timing controller 120 (shown in FIG. 1) when the difference voltage is greater than the reference voltage Vref. When an over current occurs during a predetermined frame, the timing controller 120 applies an inversion method control signal to the data driving part 140, so that the liquid crystal display panel 110 is driven in an inversion method different from a current inversion method.

According to an exemplary embodiment of the present inventive concept, the difference voltage detecting part 620 monitors a difference voltage between two terminals of the current detecting part 610. When the difference voltage is greater than the reference voltage Vref, the comparator 640 applies a high signal to the timing controller 120. The timing controller 120 converts an inversion method based on the high signal to drive the liquid crystal display panel 110.

The timing controller 120 continuously converts an inversion method until a power consumption of the operational amplifier OP-AMP is decreased, that is, the difference voltage of the two terminals of the current detecting part 610 is decreased. For example, if the power consumption of the OP-AMP decreases below a threshold amount, the current inversion driving method is maintained or set to an initial driving method.

Figure 5:
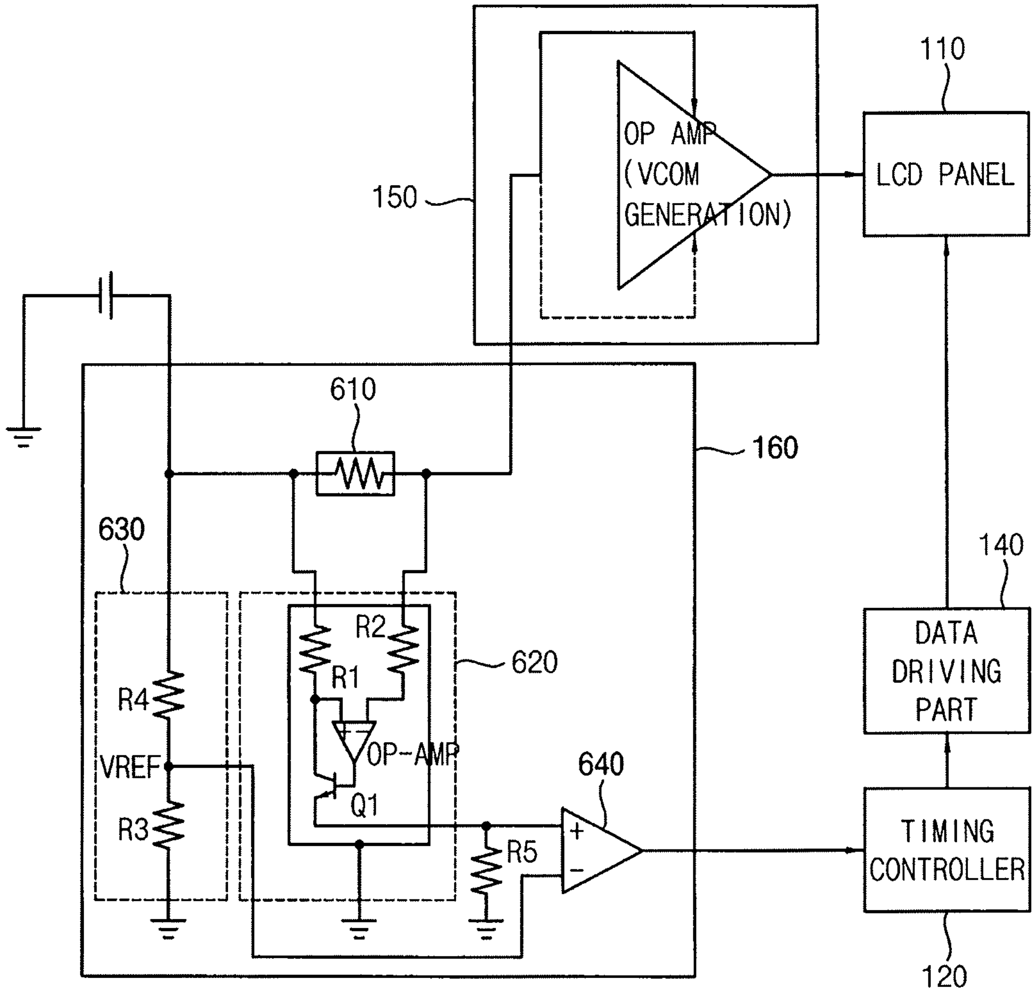
FIG. 5 is a circuit diagram schematically illustrating a common voltage distortion detecting circuit shown in FIG. 4 according to an exemplary embodiment of the inventive concept.

FIG. 5 is a circuit diagram schematically illustrating a common voltage distortion detecting circuit shown in FIG. 4.

Referring to FIG. 5, the common voltage distortion detecting circuit 160 includes a current shunt resistor 610, the difference voltage detecting part 620, the reference voltage generating part 630 and the comparator 640.

The current shunt resistor 610 is disposed between the common voltage applying part 150 generating a common voltage VCOM applied to a liquid crystal display panel 110 and an input power terminal to convert amplitude of a current into a voltage. A load current passing through the current shunt resistor 610, that is, a current applied to a power terminal of the operational amplifier OP-AMP is converted into a voltage by equation V=IR, so that the difference voltage detecting part 620 may monitor the voltage.

The difference voltage detecting part 620 includes a current shunt mirror for amplifying a voltage or a current and is connected to two terminals of the current shunt resistor 610 to detect a difference voltage, and then outputs a difference voltage to the comparator 640.

The current shunt mirror includes a first resistor R1, a second resistor R2, an operational amplifier OP-AMP and a bipolar junction transistor ("BJT") Q1. The first resistor R1 has a first terminal connected to an input terminal of the current shunt resistor 610 and a second terminal connected to a positive polarity input terminal of the operational amplifier OP-AMP. The second resistor R2 has a first terminal connected to an output terminal of the current shunt 610 and a second terminal connected to a negative polarity input terminal of the operational amplifier OP-AMP. The operational amplifier OP-AMP has a positive polarity input terminal connected to a second terminal of the first resistor R1, a negative polarity input terminal connected to the second terminal of the second resistor R2 and an output terminal connected to a gate of the BJT transistor Q1. The BJT transistor Q1 has a base connected to an output terminal of the operational amplifier OP-AMP, a collector connected to a positive polarity input terminal of the operational amplifier OP-AMP and an emitter connected to the comparator 640.

The current shunt mirror activates BJT transistor Q1 to apply a voltage to a positive polarity terminal of the comparator 640.

The reference voltage generating part 630 includes a voltage dividing part (e.g., voltage divider) which divides the input power to generate the reference voltage Vref. The voltage dividing part includes a third resistor R3 and a fourth resistor R4 to provide the comparator 640 with the reference voltage Vref. The third resistor R3 includes a first terminal connected to a ground terminal. The fourth resistor R4 includes a first terminal receiving the input power and a second terminal connected to a second terminal of the third resistor R3.

The comparator 640 compares the difference voltage and the reference voltage Vref. The comparator 640 outputs an over current signal to the timing controller 120 when the difference voltage is greater than the reference voltage Vref.

The comparator 640 compares the reference voltage Vref applied through a negative polarity terminal and a difference voltage applied through a positive polarity terminal, and then delivers a signal of a high level or a low level to the timing controller 120. When the difference voltage is greater than the reference voltage, the comparator 640 deliveries a signal of a high level to the timing controller 120. Moreover, when the difference voltage is smaller than or equal to the reference voltage, the comparator 640 deliveries a signal of a low level to the timing controller 120. For example, the comparator 640 may output the signal of the high level to indicate that a change to the inversion driving method is needed and output the signal of the low level to indicate that the current inversion driving method should be maintained or an initial driving method should be restored.

As described above, when an input power (i.e., a current value) applied to an operational amplifier of the common voltage applying part 150 is greater than a reference voltage, a signal is provided to the timing controller 120 so that an inversion method of the liquid crystal display panel 110 is converted. In certain cases, most of the image quality problems and heat problems are attributed to the process of compensating a distortion of the common voltage. However, an embodiment of the present inventive concept may stabilize display quality stability due to distortion of the common voltage (VCOM), reduce or eliminate overheating, and reduce or eliminate noise due to a power ripple.

Figure 6:
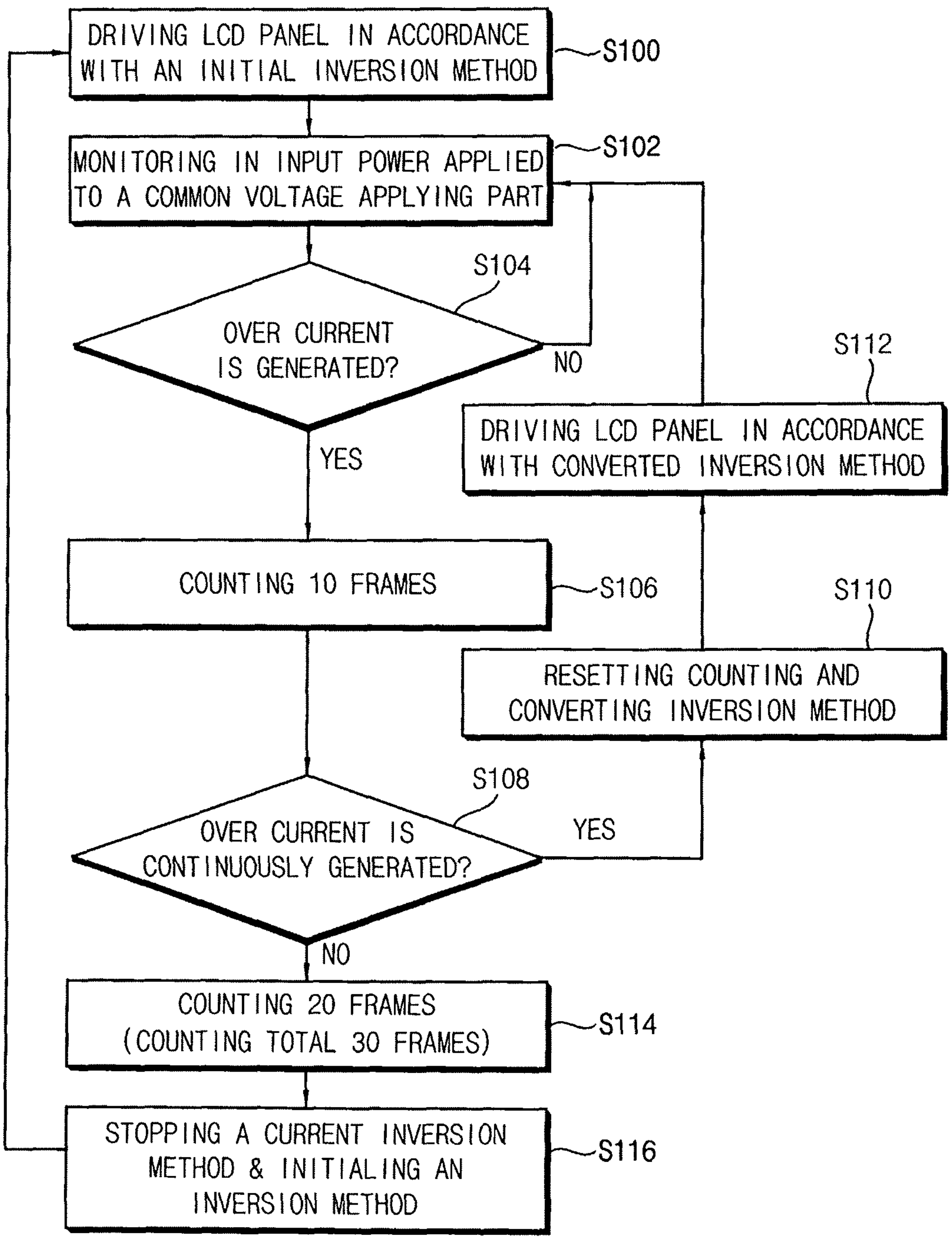
FIG. 6 is a flow diagram illustrating a method of driving a liquid crystal display device according to an exemplary embodiment of the inventive concept.

FIG. 6 is a flow diagram illustrating a method of driving a liquid crystal display device according to an exemplary embodiment of the inventive concept.

Referring to FIG. 6, a liquid crystal display panel (e.g., 110) is driven in accordance with an initial inversion method (step S100). The initial inversion method may be one of a line inversion driving, a column inversion driving, a dot inversion, a frame inversion driving, a (1+2) dot inversion driving, and a (1+2) line inversion driving, etc. The line inversion driving may refers to an inversion method that data signals having the same polarity with respect to a common voltage VCOM are applied to each horizontal gate line in the pixel array, and the polarities of the data signals at adjacent two lines are opposite to each other. The column inversion driving refers to an inversion method where data signals having opposite polarity with respect to the common voltage VCOM are applied to each frame. The dot inversion refers to an inversion method where data signals having opposite polarity with respect to the common voltage VCOM are applied to each horizontal gate line in the pixel array, and the polarities of the data signals at adjacent two lines are opposite to each other. The frame inversion driving refers to an inversion method that data signals having a first polarity with respect to the common voltage VCOM are applied to each horizontal gate line in the pixel array for even-numbered frames, and data signals having a second polarity with respect to the common voltage VCOM are applied to each horizontal gate line in the pixel array for odd-numbered frames. The (1+2) dot inversion driving refers to an inversion method that a first pixel in a column direction is driven in a first polarity with respect to the common voltage VCOM, and second and third pixels in a column direction are driven in a second polarity with respect to the common voltage VCOM. The (1+2) line inversion driving refers to an inversion method that a first line is driven in a first polarity with respect to the common voltage VCOM, and second and third lines are driven in a second polarity with respect to the common voltage VCOM.

A common voltage distortion detecting circuit monitors an input power applied to a common voltage applying part (step S102). In a present exemplary embodiment of the inventive concept, in order to generate a common voltage VCOM, an operational amplifier is disposed in the common voltage applying part, and the input power is a power provided to a positive power applying terminal of the operational amplifier and a power provided to a negative power applying terminal of the operational amplifier.

The common voltage distortion detecting circuit determines whether or not an over current is generated in the monitoring result performed in step S102 (step S104).

When it is determined that an over current is generated in step S104, the timing controller counts for 10 frames (step S106). In this case, the reason for counting 10 frames is to exclude an over current being temporarily generated. For example, if an over current is only generated for a small period of time, it can be ignored. The inventive concept is not limited to counting for 10 frames or frame periods as this number can be adjusted lower or higher in other embodiments.

After the timing controller has counted for 10 frames, it determines whether or not an over current is continuously generated (step S108). That is, when an over current is generated during at least 10 frames, the timing controller converts an inversion method of a liquid crystal display panel in accordance with embodiments of the present inventive concept. For example, if the timing controller determines that an overcurrent is present during each of the 10 frames it concludes that the overcurrent has been continuously generated. In another example, if the timing controller determines that the overcurrent is present in a majority of the counted frames, it concludes that the overcurrent has been continuously generated. In another example, the timing controller determines that an overcurrent is initially present and if after a period of time equivalent to the counting of the 10 frames elapses the timing controller again determines that the overcurrent is still present, it concludes that the overcurrent is continuously generated.

When the timing controller determines that an over current is continuously generated in step S108, it resets the count and it converts an inversion method of a liquid crystal display panel (step S110). For example, when the initial inversion method is a line inversion driving, the converted inversion driving may be one of a column inversion driving, a dot inversion, a frame inversion driving, a (1+2) dot inversion driving, and a (1+2) line inversion driving. Moreover, when the initial inversion method is a column inversion driving, the converted inversion driving may be one of a dot inversion, a frame inversion driving, a (1+2) dot inversion driving, and a (1+2) line inversion driving. In this case, the inversion method may be varied in a predetermined sequence according to a designer of the liquid crystal display device.

Then, the timing controller drives a liquid crystal display panel in accordance with a converted inversion method (step S112), and then the step S102 is performed.

When it is determined that an over current is not continuously generated in step S108, the timing controller counts 20 frames (step S114).

Then, the timing controller stops a current inversion method to initiate an inversion method (step S116), and then the step S100 is performed.

For example, if the initial driving method was dot inversion driving, the initial driving method was changed thereafter to frame inversion driving due to an overcurrent, and after this change step S108 determines that the overcurrent is not continuously maintained, the current frame inversion driving is stopped in step S116 and a selected driving method is reset to the initial dot inversion driving so that step S100 can drive the panel in accordance with the initial dot inversion driving method.

Figure 7:
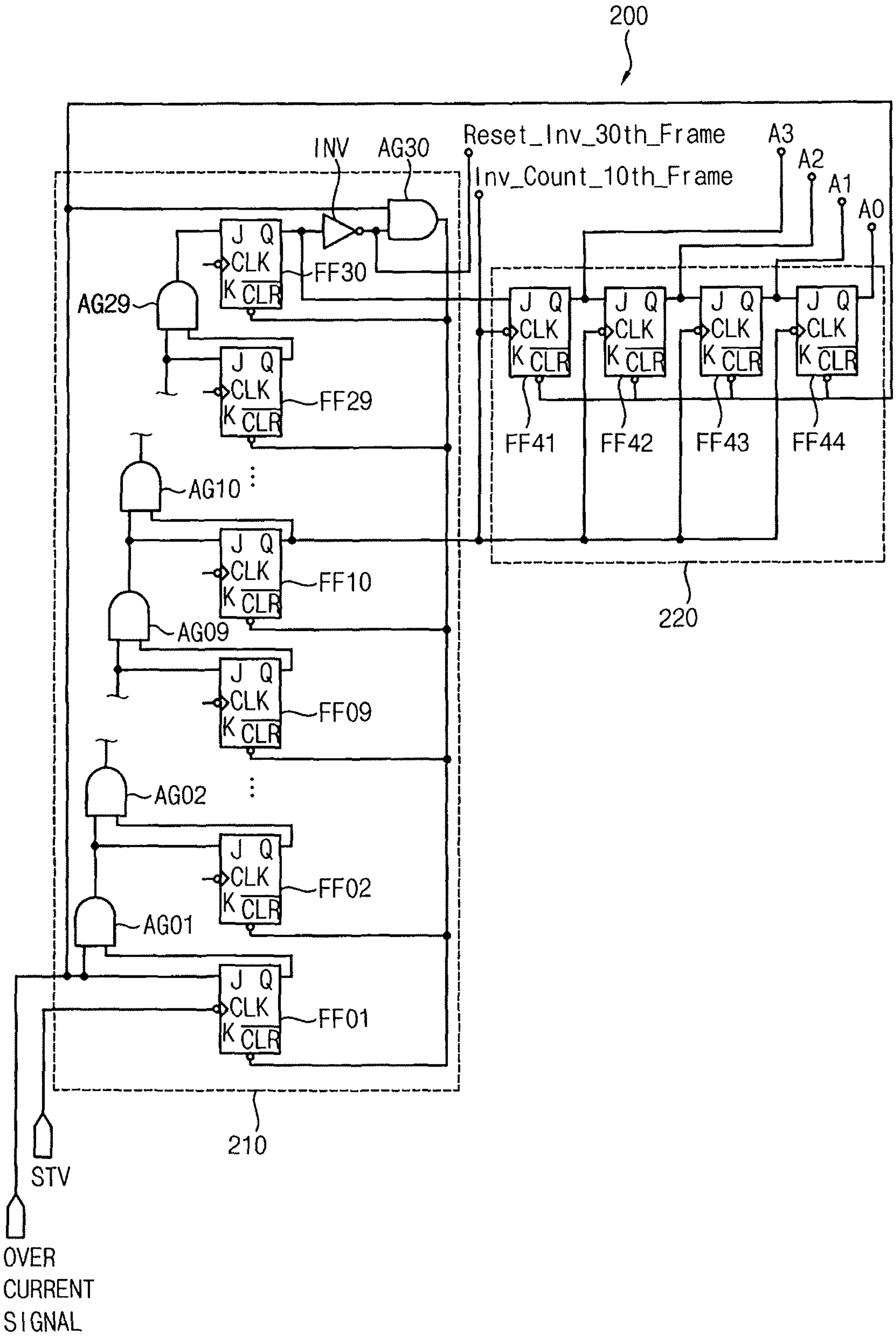
FIG. 7 is a circuit diagram schematically illustrating an inversion method converting part of a timing controller shown in FIG. 5 according to an exemplary embodiment of the inventive concept.

FIG. 7 is a circuit diagram schematically illustrating an inversion method converting part of a timing controller shown in FIG. 5.

Referring to FIG. 7, an inversion method converting part 200 of the timing controller 120 includes a counter part 210 and a shift register part 220 to realize a real inversion driving.

The counter part 210 includes a plurality of AND gates, a plurality of JK flop-flips and an inverter INV. The counter part 210 counts a time that an over current is continued by a frame in response to a start of vertical signal (STV) informing (indicating) of a start of a frame provided from an external device.

A JK flip-flop and an AND gate are configured in one pair to count 1 frame. For example, when the JK flip-flop and the AND gate are configured in ten pairs, 10 frames may be counted. For another example, when the JK flip-flop and the AND gate are configured in thirty pairs, 30 frames may be counted.

A JK flip-flop FF01 includes a J input terminal receiving an over current signal, a clock terminal receiving STV signal and a Q output terminal connected to a first input terminal of an AND gate AG01. The AND gate AG01 includes a first input terminal connected to a Q output terminal of the JK flip-flop FF01, a second input terminal receiving an over current signal, and an output terminal connected to a second input terminal of the AND gate AG02 and a J input terminal of the JK flip-flop FF02.

A JK flip-flop FF02 includes a J input terminal connected to an output terminal of the AND gate AG01. The AND gate AG02 includes a second input terminal connected to an output terminal of the AND gate AG01, and an output terminal commonly connected to a second input terminal of a following AND gate (not shown) and a J input terminal of a following JK flip-flop (not shown).

In a similar manner to the above described, a JK flip-flop FF09 includes a J input terminal connected to an output terminal of a previous AND gate (not shown), and a Q output terminal connected to a first input terminal of an AND gate AG09. A first input terminal of the AND gate AG09 is connected to a Q output terminal of a JK flip-flop FF09, a second input terminal of the AND gate AG09 is connected to an output terminal of a previous AND gate (not shown), and an output terminal of the AND gate AG09 is commonly connected to a J input terminal of a JK flip-flop FF10 and a second input terminal of an AND gate AG10.

A JK flip-flop FF10 includes a J input terminal connected to an output terminal of the AND gate AG09, and a Q output terminal commonly connected to a first input terminal of AND gate AG10, a ten frame counter terminal Inv_Count_10th_Frame and clock terminals of JK flip-flops of the shift register part 220. An AND gate AG10 includes a first input terminal connected to a Q output terminal of the JK flip-flop FF10, a second input terminal connected to an output terminal of the AND gate AG09, and an output terminal connected to a J input terminal of a following JK flip-flop (not shown).

In a similar manner to the above described, a J input terminal of a JK flip-flop FF29 is connected to an output terminal of a previous AND gate (not shown), and a Q output terminal of the JK flip-flop FF29 is connected to a first input terminal of an AND gate AG29. A first input terminal of the AND gate AG29 is connected to a Q output terminal of the JK flip-flop FF29, a second input terminal of the AND gate AG29 is connected to a J input terminal of the JK flip-flop FF29 and an output terminal of a previous AND gate (not shown), and a output terminal of the AND gate AG29 is connected to a J input terminal of a JK flip-flop FF30.

A J input terminal of the JK flip-flop FF30 is connected to an output terminal of an AND gate AG29, and a Q output terminal of the JK flip-flop FF30 is connected to an input terminal of an inverter INV and a shift register part 220. The output of the inverter INV is connected to a thirty frame reset terminal Reset_Inv_30th Frame.

The inverter INV is connected to a Q output terminal of the JK flip-flop FF30, a first input terminal of the AND gate AG30 and the thirty frame reset terminal Reset_Inv_30th Frame.

The AND gate AG30 performs an AND arithmetic operation on a signal outputted through an output terminal and an over current signal to output the results of the AND operations to clear terminals of JK flip-flops.

In the present exemplary embodiment, in order to count the number of frames, it is described that the counter part 210 is configured by a plurality of AND gates and a plurality of JK flip-flops. However, the counter part 210 may be configured by another logical element.

The shift register part 220 includes a plurality of JK flip-flops connected in a sequential manner. When the timing controller 120 determines that an over current is generated during a predetermined frame using the counter part 210, the shift register part 220 may output a signal which changes a register value of a register storing information for an inversion method of a liquid crystal display panel. The register may be disposed within the timing controller 120. In an exemplary embodiment, the shift register part 220 includes a JK flip-flop FF41, a JK flip-flop FF42, a JK flip-flop FF43 and a JK flip-flop FF44.

The JK flip-flop FF41 includes a J input terminal connected to a Q output terminal of JK flip-flop FF30, a clock terminal connected to a Q output terminal of JK flip-flop FF10, and a Q output terminal commonly connected to a fourth terminal A3 and a J input terminal of the JK flip-flop FF42.

The JK flip-flop FF42 includes a J input terminal connected to a Q output terminal of the JK flip-flop FF41, a clock terminal connected to a Q output terminal of JK flip-flop FF10, and a Q output terminal commonly connected to a third terminal A2 and a J input terminal of the JK flip-flop FF43.

The JK flip-flop FF43 includes a J input terminal connected to a Q output terminal of the JK flip-flop FF42, a clock terminal connected to a Q output terminal of JK flip-flop FF10, and a Q output terminal commonly connected to a second terminal A1 and a J input terminal of the JK flip-flop FF44.

The JK flip-flop FF44 includes a J input terminal connected to a Q output terminal of the JK flip-flop FF43, a clock terminal connected to a Q output terminal of JK flip-flop FF10, and a Q output terminal connected to a first terminal A0.

A register area may be allocated in the timing controller 120 so as to set a plurality of inversion methods. In an exemplary embodiment, signals respectively outputted through a first terminal A0, a second terminal A1, a third terminal A2 and a fourth terminal A3 of the shift register 220 are defined as an inversion method requesting signal of 4 bits. For example, a signal outputted through the fourth terminal A3 is mapped to a position of bit 0 (that is, a Least Significant Bit (LSB)), a signal outputted through the third terminal A2 is mapped to a position of bit 1, a signal outputted through the second terminal A1 is mapped to a position of bit 2, and a signal outputted through the first terminal A0 is mapped to a position of bit 3 (that is, a Most Significant Bit (MSB)).

Therefore, it may be set as a signal for requesting a column inversion driving when a signal outputted from the shift register 220 is [0001], and it may be set as a signal for requesting a dot inversion driving when a signal outputted from the shift register 220 is [0011]. Moreover, it may be set as a signal for requesting a (1+2) dot inversion driving when a signal outputted from the shift register 220 is [0111], and it may be set as a signal for requesting a line inversion driving when a signal outputted from the shift register 220 is [1111]. The inventive concept is not limited to the above bit patterns for requesting the corresponding driving methods.

When an over current is generated, the timing controller 120 converts a register value stored in a register area to convert an inversion method.

In an exemplary embodiment, in order to convert the register value when an over current is generated, it is described that the shift register part 220 is embodied with a plurality of JK flip-flops. However, the shift register part 220 may be configured by another logical element.

Figure 8:
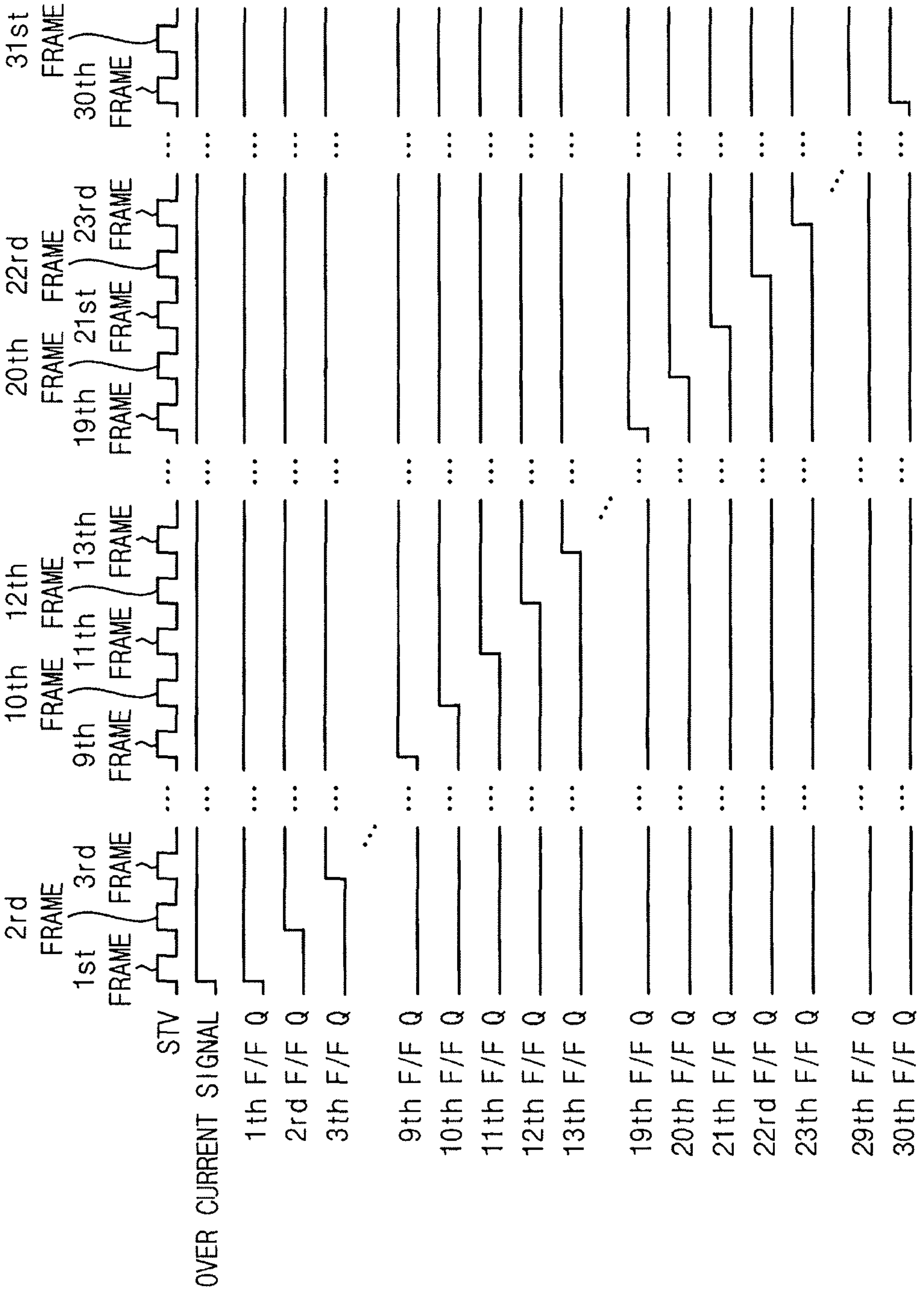
FIG. 8 is a waveform diagram explaining an operation of the inversion method converting part shown in FIG. 7.

FIG. 8 is a waveform diagram explaining an operation of the inversion method converting part 200 shown in FIG. 7.

Referring to FIGS. 7 and 8, an inversion method converting part 200 includes thirty JK flip-flops. When a STV signal informing of a start of a frame is applied to the inversion method converting part 200, the inversion method converting part 200 may count the number of frames.

Firstly, when an over current signal and a clear signal are synchronized with each other so that an over current is not detected, all JK flip-flops that are registers are initialized.

When a Q output terminal of the thirtieth JK flip-flop outputs a high signal (that is, an over current is maintained for thirty frames), an input to an AND gate AG30 is converted into a low level by an inverter INV connected to the Q output terminal of the thirtieth JK flip-flop. Thus, an output of the AND gate AG30 is applied to an inversion clear terminal of all JK flip-flops of the counter part 210, so that all JK flip-flops of the counter part 210 are initialized.

Then, when an over current is generated and the over current is maintained for no less than 10 frames, a 10 frames count signal outputted through a ten frame count terminal is at a high level. When all JK flip-flops are reset, the 10 frames count signal is falling. Moreover, in the shift register 220, the fourth terminal A3 is converted from a low status (level) to a high status (level). Thus, a signal outputted through the first terminal A0, the second terminal A1, the third terminal A2 and the fourth terminal A3 of the shift register 220 may be [0001].

Then, when an over current is again generated and the over current is maintained for no less than 10 frames, the 10 frames count signal is at a high level. When all JK flip-flops are reset, the 10 frames count signal is falling. Moreover, in the shift register 220, the fourth terminal A3 is maintained at a high status, and the third terminal A2 is converted from a low status to a high status. Thus, a signal outputted through the first terminal A0, the second terminal A1, the third terminal A2 and the fourth terminal A3 of the shift register 220 may be [0011].

Then, when an over current is again generated and the over current is maintained for no less than 10 frames, the 10 frames count signal is at a high level. When all JK flip-flops are reset, the 10 frames count signal is falling. Moreover, in the shift register 220, the fourth terminal A3 and the third terminal A2 are maintained at a high status, and the second terminal A1 is converted from a low status to a high status. Thus, a signal outputted through the first terminal A0, the second terminal A1, the third terminal A2 and the fourth terminal A3 of the shift register 220 may be [0111].

Then, when an over current is again generated and the over current is maintained for no less than 10 frames, the 10 frames count signal is at a high level. When all JK flip-flops are reset, the 10 frames count signal is falling. Moreover, in the shift register 220, the fourth terminal A3, the third terminal A2 and the second terminal A1 are maintained at a high status, and the first terminal A0 is converted from a low status to a high status. Thus, a signal outputted through the first terminal A0, the second terminal A1, the third terminal A2 and the fourth terminal A3 of the shift register 220 may be [1111].

As described above, according to an exemplary embodiment of the inventive concept described herein, a monitoring of a distortion of a common voltage is performed to convert an inversion method in real-time, so that it may ensure the stability of display quality by avoiding a critical pattern.

Moreover, in order to compensate for a distortion of a common voltage, a monitoring of a power consumed in an operation amplifier OP-AMP may be performed, so that an inversion method may be converted to minimize the distortion of the common voltage. Therefore, at least one embodiment of the inventive concept may decrease a power consumption of a liquid crystal display panel as well as a power consumption of an operational amplifier.

Moreover, at least one embodiment of the inventive concept may reduce overheating due to the power consumption or reduce noise due to a power ripple.

Having described exemplary embodiments of the inventive concept, it is further noted that various modifications may be made to these embodiments without departing from the spirit and scope of the inventive concept.

What is claimed is:

1. A common voltage distortion detecting circuit, comprising:

a current sensor disposed between a circuit configured to apply a common voltage to a liquid crystal display panel and an input power terminal providing a power voltage;

a voltage difference detecting circuit configured to detect a difference voltage between two terminals of the current sensor; and a comparator configured to compare the difference voltage and a reference voltage to output an over current signal to convert an inversion method of the liquid crystal display panel when the difference voltage is greater than the reference voltage.

2. The common voltage distortion detecting circuit of claim 1, wherein the voltage difference detecting circuit comprises a current shunt mirror configured to amplify a voltage or a current.

3. The common voltage distortion detecting circuit of claim 2, wherein the current shunt mirror comprises:

a first resistor having a first terminal connected to an input terminal of the current sensor;

a second resistor having a first terminal connected to an output terminal of the current sensor;

an operational amplifier having a positive input terminal connected to a second terminal of the first resistor and a negative input terminal connected to a second terminal of the second resistor; and a bipolar junction transistor having a base connected to an output terminal of the operational amplifier, a collector connected to a second terminal of the first resistor and the positive polarity input terminal of the operational amplifier, and an emitter connected to the comparator.

4. The common voltage distortion detecting circuit of claim 1, further comprising a voltage generator configured to generate the reference voltage, wherein the voltage generator comprises a voltage divider configured to divide the power voltage outputted through the input power terminal to generate the reference voltage.

5. The common voltage distortion detecting circuit of claim 4, wherein the voltage divider comprises:

a third resistor comprising a first terminal connected to a ground terminal; and a fourth resistor comprising a first terminal connected to the input power terminal and a second terminal connected to a second terminal of the third resistor to provide the comparator with the reference voltage.

6. A liquid crystal display device, comprising:

a liquid crystal display panel comprising a switching element connected to a gate line and a data line, and a liquid crystal capacitor connected to the switching element;

a timing controller configured to output a data signal, a first control signal, a second control signal and a third control signal in response to an input image data and an input control signal;

a gate driving circuit configured to output a gate signal for driving the gate line to the gate line in response to the first control signal;

a data driving circuit configured to output the data signal to the data line in response to the second control signal;

a first circuit configured to apply a common voltage to a second terminal of the liquid crystal capacitor in response to the third control signal; and a second circuit configured to monitor an input power voltage applied to the first circuit and to output an over current signal to convert an inversion method of the liquid crystal display panel when an over current is generated.

7. The liquid crystal display device of claim 6, wherein the second circuit comprises:

a current sensor disposed between the first circuit and an input power terminal providing the input power voltage;

a voltage difference voltage detecting circuit configured to detect a difference voltage between two terminals of the current sensor to output a difference voltage; and a comparator configured to compare the difference voltage and a reference voltage to output the over current signal when the difference voltage is greater than the reference voltage.

8. The liquid crystal display device of claim 7, wherein the second circuit further comprises a voltage generator configured to generate the reference voltage, and wherein the voltage generator comprises a voltage divider configured to divide the power voltage outputted through the input power terminal to generate the reference voltage.

9. The liquid crystal display device of claim 7, wherein the timing controller is configured to convert an inversion method of the liquid crystal display panel based on the over current signal.

10. The liquid crystal display device of claim 9, wherein the second control signal comprises a start pulse vertical STV signal indicating a start of a frame, wherein the timing controller comprises:

a counter configured to count a time that an over current is continued by a frame in response to the STV signal; and a shift register configured to output a signal which changes a register value of a register storing information for the inversion method of the liquid crystal display panel, when the timing controller determines that the over current is generated during a predetermined frame using the counter.

11. The liquid crystal display device of claim 10, wherein the counter comprises a plurality of AND gates, a plurality of JK flip-flops and an inverter.

12. The liquid crystal display device of claim 6, wherein the shift register comprises a plurality of JK flip-flops connected in a sequential manner.

13. The liquid crystal display device of claim 7, wherein the voltage difference detecting circuit comprises a current shunt mirror configured to amplify a voltage or current.

14. The liquid crystal display device of claim 6, wherein the timing controller converts the inversion method by selecting an inversion method from a plurality of inversion methods other than a current inversion method in response to the over current signal, and controls the data driving circuit so as to control a polarity of the data signal in accordance with the selected inversion method.

15. The liquid crystal display device of claim 14, wherein the inversion methods comprise a line inversion driving, a column inversion driving, a dot inversion driving, a frame inversion driving, a (1+2) dot inversion driving, and a (1+2) line inversion driving.

16. The liquid crystal display device of claim 6, wherein the timing controller controls the data driving circuit, so that the data driving circuit converts a polarity of the data signal to output the converted polarity of the data signal, when the over current is continuously provided for a first frame.

17. A method of driving a liquid crystal display device, the method comprising:

driving, by a controller, a liquid crystal display panel in accordance with an initial inversion method;

monitoring, by a first circuit, an input power applied to a second circuit to determine whether an over current is generated or not, the second circuit configured to apply a common voltage to the liquid crystal display panel;

counting, by the controller, a number of first frames when it is determined that the over current is generated;

changing, by the controller, inversion method of the liquid crystal display panel when it is determined that the over current is continuously generated; and driving, by the controller, the liquid crystal display panel in the changed inversion method.

18. The method of claim 17, further comprising:

counting, by the controller, a number of second frames when it is determined that the over current is not continuously generated; and setting a current inversion method of the liquid crystal display panel to the initial inversion method.

19. The method of claim 18, wherein the number of the first frames is ten, and the number of the second frames is twenty.

20. A liquid crystal display device, comprising:

a liquid crystal display panel comprising a switching element connected to a data line and a liquid crystal capacitor;

a data driving circuit configured to output a data signal to the data line;

a first circuit configured to apply a common voltage to the liquid crystal capacitor;

a second circuit configured to monitor an input power voltage applied to the first circuit to determine whether an over current is present; and a timing controller configured to change a current inversion driving method of the panel to a next method within a sequence of inversion driving methods when the over current is determined to be present, wherein the timing controller controls the data driving circuit to set a polarity of the data signal in accordance with the selected inversion driving method.

* * * * *